No. 791,859. PATENTED JUNE 6, 1905.
E. D. BARNES.
DENTAL SEPARATOR AND TOOTH HOLDER.
APPLICATION FILED FEB. 1, 1905.
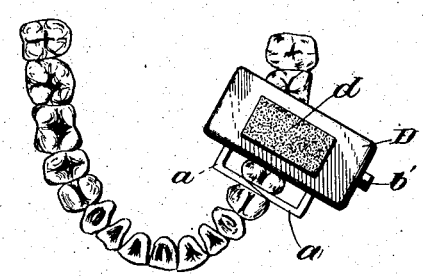
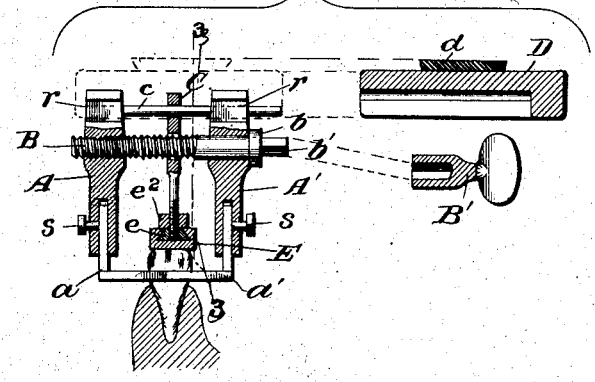
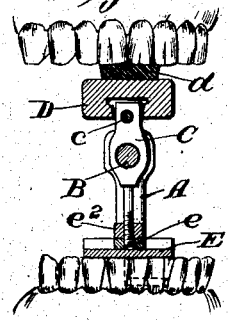
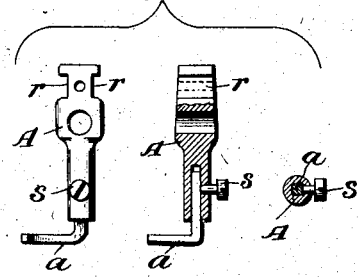
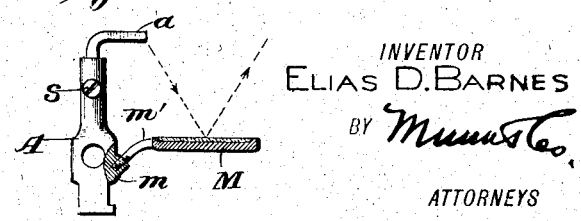
WITNESSES:
E. C. Huffey
Edw. W. Byrn.
INVENTOR
ELIAS D. BARNES
BY Munn & Co.
ATTORNEYS No. 791,859.

Patented June 6, 1905.

UNITED STATES PATENT OFFICE.

ELIAS D. BARNES, OF ENFIELD, NORTH CAROLINA.

DENTAL SEPARATOR AND TOOTH-HOLDER.

SPECIFICATION forming part of Letters Patent No. 791,859, dated June 6, 1905.

Application filed February 1, 1905. Serial No. 243,646.

*To all whom it may concern:*

Be it known that I, ELIAS D. BARNES, a citizen of the United States, residing at Enfield, in the county of Halifax and State of North Carolina, have invented a new and useful Improvement in Dental Separators and Tooth-Holders, of which the following is a specification.

My invention is in the nature of a combined dental separator, tooth-holder, and mouth-prop. It is an instrument to be used by dentists for getting space between the natural teeth for facilitating access to cavities between the teeth when filling the same and to give access for polishing or making examinations and which device is also designed to be so held upon the teeth as to prevent the separator-claws from pressing on the gums and which device also serves as a prop between the upper and lower teeth to hold the mouth open.

My invention consists in the novel construction and arrangement of the device, which I will now proceed to describe with reference to the drawings, in which—

Figure 1 is a top plan view of the device shown applied to the lower set of teeth. Fig. 1$^a$ is a detail illustrating the wedge action in separating two adjacent teeth. Fig. 2 is a vertical section taken transversely to the row of teeth, showing the rest-bar and winding-key offset to one side. Fig. 3 is a section on line 3 3 of Fig. 2, showing the rest-bar in place and holding the jaws apart as a mouth-prop. Fig. 4 represents details of one of the prong-holders, and Fig. 5 shows a prong-holder with a mirror attachment as used for operating on the teeth of the upper jaw.

In the drawings, A A' represent two prong-holders, which are short upright pillars having square sockets in their lower ends, in which are adjustably seated the square and vertically-adjustable shanks of the prongs $a$ $a'$. These prongs are bent twice at right angles at their lower ends, and their points are made wedge-shaped, as seen in Fig. 1$^a$, and which wedge-points are arranged to be advanced toward each other between two adjacent teeth, as indicated by the arrows in Fig. 1$^a$, to wedge apart the two adjacent teeth to increase the space between the same. This adjustment of the two prongs to or from each other is effected by an adjustment of the prong-holders to or from each other by means of a screw-shaft B, Fig. 2. This screw-shaft passes through transverse holes in the enlarged upper ends of the prong-holders, and one of these holes in holder A is screw-threaded to mesh with the threads of the screw-shaft, while a collar $b$ on the other end of the screw-shaft bears against the outer side of the other prong-holder A'. A squared end $b'$ on the screw-shaft is adapted to be seated in the square socket of a thumb-wrench or key B', by which the shaft B may be turned.

Projecting laterally from one of the prong-holders A is a guide-pin $c$, which is rigidly attached to the prong-holder and passes loosely through a hole in the other prong-holder, as seen in Fig. 2, in a position parallel to the screw. This guide-pin holds and guides the prong-holders in their adjustment and also helps to support the tooth-holder C. This tooth-holder is pierced with holes to receive the pin $c$ and the screw B. At its lower end the tooth-holder is screw-threaded and entered into a dovetail slide $e$ in a correspondingly-grooved platen E, which rests on the crown of the teeth. A screw-nut $e^2$ is arranged on the shank of the tooth-holder and is arranged to be turned down to force the platen E against the teeth, thus making the tooth-holder vertically adjustable. The dovetail sliding block $e$ is made adjustable in the groove of the platen E, so that the latter may be slipped lengthwise to change its position in relation to the teeth to give more or less room in gaining access to the cavities between the teeth.

The upper ends of the prong-holders are recessed at $r$ $r$ upon opposite sides, as seen in Fig. 4, and on these upper ends there slides a rest or pressure-block D, having on top of the same a cushion $d$, of soft rubber or other similar material, which forms a rest or bearing for the teeth of the jaw opposite the one being operated on. The presser-block D has an undercut groove fitting the recesses $r$ $r$ on the tops of the prong-holders, so that the parts are securely but detachably held together.

The tooth-holder C is arranged between the two prong-holders A and A', and it has in connection with the platen E several important functions, as follows: In the first place when the wedge-shaped prongs $a\ a'$ are forced together between two adjacent teeth the unrestrained tendency of these wedges would be to crowd toward and against the gums on account of the taper of the teeth, and this under the powerful action of the screw would involve an excessive and intolerable pain. It therefore becomes necessary to prevent these wedge-prongs from crowding against the gums, and this is one of the leading functions of the tooth-holder, for it will be seen from Fig. 2 that it prevents the prongs from approaching the gums. To regulate the approach to the gums for different teeth, the screw-nut $e^2$ is supplied, which by being turned on the screw-threaded shank of the holder will force the platen E up or down, and thus regulate the approach of the prongs to the gum. Another function of the tooth-holder is to hold the tooth to its deflected position in connection with the prongs, and a still further function is to form the bottom bearing for the device on the teeth, and thus form a prop in connection with the presser-block D to hold the jaws apart and relieve the strain on the patient required in holding the jaws open, as well as preventing any involuntary closing of the jaws of the patient and the consequent interference with the dentist's work at a critical period. The prong-holders and screw, it will be seen, form a body-frame upon which are carried the upper and lower bearing-surfaces. Another very important function of this tooth-holder is when the teeth are separated and are to be filled with gold this holder can be adjusted so as to hold the tooth as though it were in a vise by means of a rubber cushion pressing against said tooth to relieve the patient of that unpleasant and painful sensation caused by malleting, use of sandpaper disk, and strips, of which so many patients complain. The shanks of the wedge-prongs are made vertically adjustable in the holders to suit the mouth of the patient, and this adjustment is fixed by means of set-screws $s$.

When the upper jaw is being operated upon, the device is inverted, as seen in Fig. 5, and to aid the dentist in this position in inspecting the work the prong-holders are formed on the side with a little socket $m$, into which is detachably screwed the shank $m'$ of a small mirror M, which will give a reflection in the direction of the dotted arrow. To permit variation in the position and angle of the mirror, its shank is made of some easily-flexible material.

In defining my invention with greater clearness I would state that I am aware that dental separators have heretofore been devised in which wedge-shaped prongs or claws were forced between the teeth by the action of a screw, and I do not claim this broadly.

Having thus described my invention, what I claim as new, and desire to secure by Letters Patent, is—

1. A dental separator, comprising separating-prongs, means for separating the teeth thereby, and a frame carrying the same having bearing-surfaces for both the upper and lower jaw substantially as described.

2. A dental separator, comprising separating-prongs, means for separating the teeth thereby, a frame carrying the same, bearing-surfaces for both the upper and lower jaw and means for adjusting these bearing-surfaces to or from each other substantially as described.

3. A dental separator, comprising separating-prongs, means for separating the teeth thereby, a frame carrying the same, bearing-surfaces for both the upper and lower jaw and means for adjusting one of these bearing-surfaces laterally along the teeth substantially as described.

4. A dental separator, comprising separator-prongs bent twice at right angles, parallel upright holders for the prongs, an adjusting-screw passing transversely through the prong-holders and a guide-bar extending from one holder to the other in position parallel to the screw substantially as described.

5. A dental separator, comprising separator-prongs bent twice at right angles, parallel upright holders for the shanks of the prongs, means for adjusting the shanks of the prongs in the holders, and a screw extending transversely through the holders substantially as described.

6. A dental separator, comprising separator-prongs, upright holders for the prongs, a screw extending transversely through the holders, and a support upon the teeth for holding the prongs away from the gum, said support being located between the prong-holders and inclosing the screw substantially as described.

7. A dental separator, comprising separator-prongs, upright holders for the prongs, a screw extending transversely to the holders, a support upon the teeth for holding the prongs away from the jaws and means for adjusting the support to or from the teeth as described.

8. A dental separator, comprising separating-prongs, upright holders for the prongs, a screw extending transversely to the holders, a guide-bar arranged parallel to the screw and a support upon the teeth arranged between the prong-holders and held upon the screw and guide substantially as described.

9. A dental separator, comprising separator-prongs, upright prong-holders, means for adjusting the holders to or from each other, and a pressure-bar arranged upon the opposite end of the prong-holders from the prongs and an oppositely-acting bearing substantially as and for the purpose described.

10. An adjustable mouth-prop carrying separator-prongs substantially as described.

11. A dental separator, comprising separator-prongs, upright holders for the prongs having recessed ends, a detachable pressure-bar inclosing the recessed ends, a screw extending transversely through the holders, a guide-bar arranged parallel to the screw, and a tooth-holder and support located between the prong-holders and loosely connected to the screw and guide, and an adjustable platen arranged on the end of the said tooth-holder substantially as described.

12. A dental separator, comprising separator-prongs, upright holders for the prongs with means for adjusting the same to or from each other, and a detachable mirror with means for connecting it to the prong-holder substantially as described.

ELIAS D. BARNES.

Witnesses:
JOHN BEAVANS,
W. E. BEAVANS.